United States Patent
Panas et al.

(10) Patent No.: US 12,474,568 B2
(45) Date of Patent: Nov. 18, 2025

(54) SYSTEM AND METHOD FOR COHERENT APERTURE OF STEERED EMITTERS

(71) Applicants: Lawrence Livermore National Security, LLC, Livermore, CA (US); Bright Silicon Technologies, Inc., San Francisco, CA (US); General Atomics, San Diego, CA (US)

(72) Inventors: Robert Matthew Panas, Dublin, CA (US); Robert McHenry, San Francisco, CA (US); David Brent Marquand, San Diego, CA (US); Eric Peter McNaul, San Diego, CA (US)

(73) Assignees: Lawrence Livermore National Security, LLC, Livermore, CA (US); Bright Silicon Technologies, Inc., San Francisco, CA (US); General Atomics, San Diego, CA (US)

(*) Notice: Subject to any disclaimer, the term of this patent is extended or adjusted under 35 U.S.C. 154(b) by 1131 days.

(21) Appl. No.: 17/332,602

(22) Filed: May 27, 2021

(65) Prior Publication Data

US 2022/0382121 A1 Dec. 1, 2022

(51) Int. Cl.
*G02B 26/08* (2006.01)
*G01J 9/02* (2006.01)
(Continued)

(52) U.S. Cl.
CPC ............ *G02B 26/0816* (2013.01); *G01J 9/02* (2013.01); *G01S 7/481* (2013.01); *G01S 7/4815* (2013.01);
(Continued)

(58) Field of Classification Search
CPC ....... G02B 26/0816; G02B 26/06; G01J 9/02; G01S 7/481; G01S 7/4815; G01S 7/4817;
(Continued)

(56) References Cited

U.S. PATENT DOCUMENTS 7,405,834 B1 * 7/2008 Marron ................. G01S 7/4812
356/450
7,999,922 B1 * 8/2011 Cochrane ........... G01B 11/2441
356/3.01
(Continued)

FOREIGN PATENT DOCUMENTS

CN 107422569 A * 12/2017 ............. G02F 1/292
DE 102012100209 A1 * 9/2012 ......... G02B 27/0037
WO WO-2006076474 A1 * 7/2006 ................ G01J 9/00

OTHER PUBLICATIONS

Gao, Haiyang, et al. "Study on the wide-angle Michelson interferometer with large air gap." Applied Optics 50.29 (2011): 5655-5661.*

*Primary Examiner* — Isam A Alsomiri
*Assistant Examiner* — Benjamin Wade Clouser
(74) *Attorney, Agent, or Firm* — HARNESS, DICKEY & PIERCE, P.L.C.

(57) ABSTRACT

A coherent aperture array system is used for steering an optical source beam. The system has spaced apart, steerable emitters each able to be mechanically aimed at a remote target location to steer portions of the source beam toward the target location. Each steerable emitter has a subaperture controllable independently of a remaining reflective surface of its associated steerable emitter, to receive and reflect a subportion of the source beam portion. The subportion forms a sense beam which is reflected toward a phase imaging system. A separate reference beam is created from the portion of the source beam travelling toward each steerable emitter. Each sense beam and each reference beam are thus associated uniquely with one of the steerable emitters. A phase imaging system uses the reference beams and the sense beams to determine phase differences between the portions of the source beam being transmitted from each steerable emitter.

19 Claims, 3 Drawing Sheets

(51) Int. Cl.
*G01S 7/481* (2006.01)
*G01S 7/491* (2020.01)
*G01S 7/4911* (2020.01)
*G01S 17/32* (2020.01)
*G01S 17/36* (2006.01)
*G01S 17/89* (2020.01)
*G02B 26/06* (2006.01)

(52) U.S. Cl.
CPC ............ *G01S 7/4817* (2013.01); *G01S 7/491* (2013.01); *G01S 7/4911* (2013.01); *G01S 17/32* (2013.01); *G01S 17/36* (2013.01); *G01S 17/89* (2013.01); *G02B 26/06* (2013.01)

(58) Field of Classification Search
CPC ........ G01S 7/491; G01S 7/4911; G01S 17/32; G01S 17/36; G01S 17/89
See application file for complete search history.

(56) References Cited

U.S. PATENT DOCUMENTS

| | | | |
|---|---|---|---|
| 8,472,103 B2 * | 6/2013 | Reichelt | G02B 26/0808 359/290 |
| 8,575,528 B1 * | 11/2013 | Barchers | G01S 7/4815 356/521 |
| 10,180,492 B2 * | 1/2019 | Protz | F41H 13/005 |
| 10,444,492 B2 | 10/2019 | Hopkins et al. | |
| 10,627,517 B2 | 4/2020 | Yaacobi et al. | |

\* cited by examiner

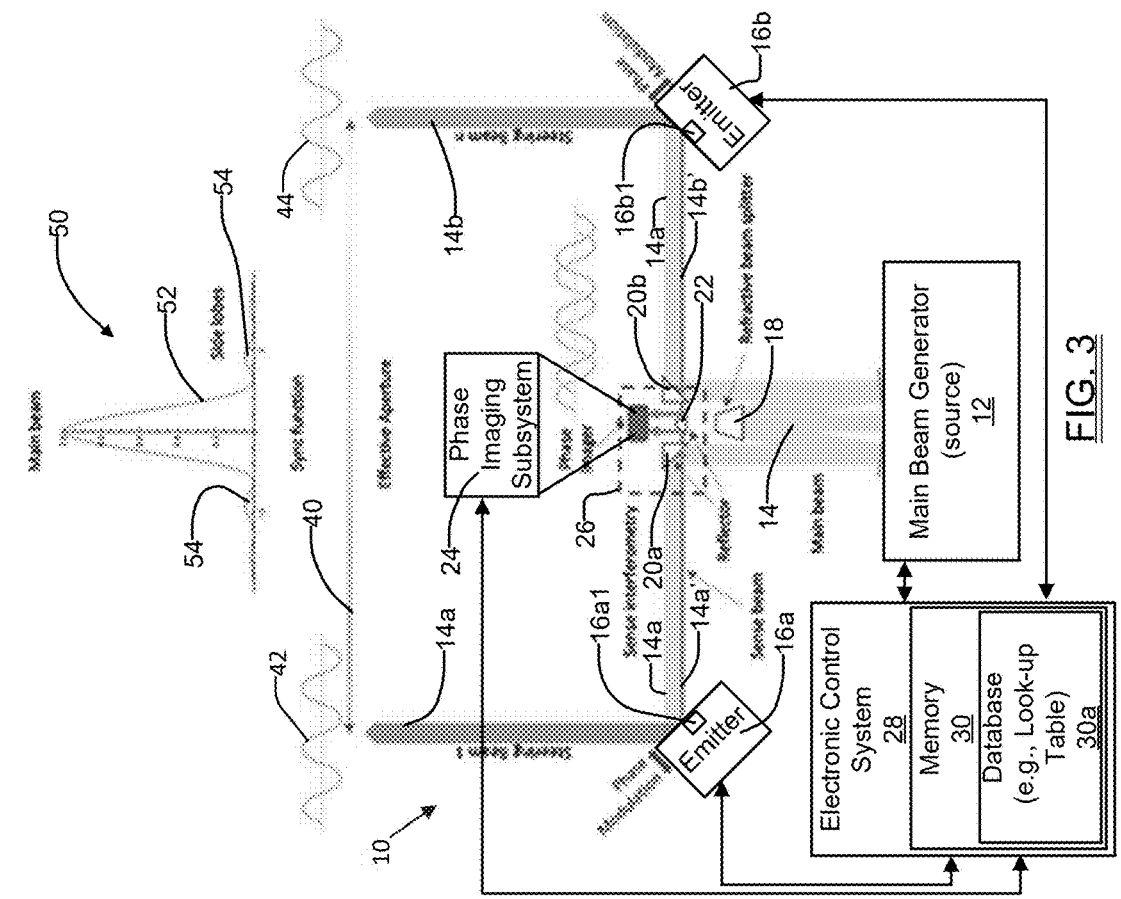
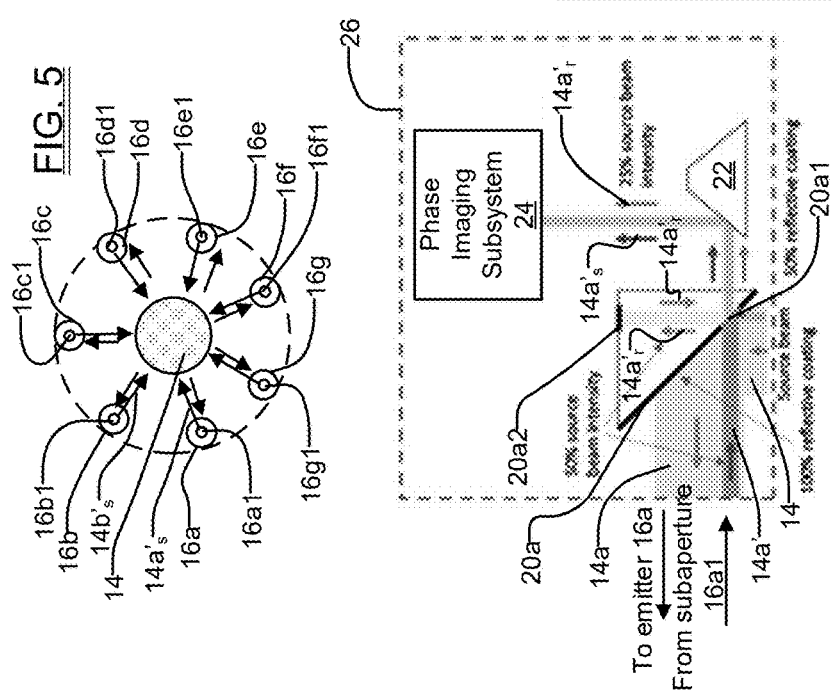

SYSTEM AND METHOD FOR COHERENT APERTURE OF STEERED EMITTERS

STATEMENT OF GOVERNMENT RIGHTS

This invention was made with Government support under Contract No. DE-AC52-07NA27344 awarded by the United States Department of Energy. The Government has certain rights in the invention.

FIELD

The present disclosure relates to systems and methods for steering optical beams, and more particularly to a system and method for forming a coherent aperture using a plurality of independently steered beams, which provides the large field of regard of traditional microscale optical phased arrays, with the large aperture and long range of traditional macroscale optical phased arrays.

BACKGROUND

The statements in this section merely provide background information related to the present disclosure and may not constitute prior art.

The use of the technique of phase coherence to steer an electromagnetic beam is not new. This approach has been used for decades on longer wavelengths (radar) where small geometric and timing uncertainties result in beam delays much less than the wavelength of the RF emitters (often in the cm-scale). Coherent synthetic apertures, known as active electronically scanned arrays (AESA) in the RF domain, provide many benefits as the steering capability is shifted from the macroscopic mechanical domain of bearings and gimbals to the electronic domain. The electronic system can be steered with great agility and can generate effects simply not possible with purely mechanical elements, such as splitting the beam. While coherent apertures are a mature technology in the RF domain, it has proved very difficult to port the concept to the optical domain where wavelengths are on the order of 1 μm, and so all uncertainties must be correspondingly reduced.

Present approaches to optical domain coherent apertures have generally been modeled on the RF domain approaches, with arrays of un-steered omnidirectional emitters, known as optical phased arrays (OPAs). One such optical phased array is disclosed in U.S. Pat. No. 10,627,517 B2, the disclosure of which is hereby incorporated by reference into the present application. The system disclosed is U.S. Pat. No. 10,627,517 B2 is intended to be fabricated at the micro-scale on a chip, resulting in a small emitter aperture. This OPA approach focuses on the use of many emitters. Larger scale, higher power OPA systems such as the DARPA Excalibur system focus on the use of fewer, higher power emitters, specifically 7 high power beams in a coherent emission mode to steer and sharpen the beam. The small systems can provide significant field-of-regard (FOR) (achievable main beam angle away from normal vector) owing to the large number of tightly packed emitters, often located only microns from each other. The FOR is set by the angular width between the main beam and the next diffraction order of the main beam. This is set by adjacent emitters (especially so in a uniform array) emitting at 360° out of phase. A fresh higher order replication of the main beam is generated at each angle associated with another full 360° phase wrap. The emission forms a wavefront at an angle with the emitter pitch represented by a triangle with one leg of the triangle based on the emitter pitch and the other leg based on n-times the wavelength. With the main beam replicating at these angles, the FOR is then found as the angle between repeat beams, and all angles beyond the FOR should be blocked from leaving the optical system, leaving only the single main beam emitted. Any further steering past the FOR will bring the next main beam diffraction order into the active field of view of the system, effectively 'wrapping it' around to show up at the other side of the FOR.

While the compact configuration of OPAs provide high FOR, the need for such tightly packed emitters results in small absolute aperture size, often on the mm-scale. Small apertures mean limited laser power and high divergence angle on the emitted beam, so the emitted beam loses intensity quickly as it propagates. In other words, these small apertures are not useful for long range precision operation.

Great efforts have been made to expand the total aperture scale of OPAs with little success. This is due in large part to the challenge of stabilizing potentially millions to billions of active phase delay feedback loops to the nm-scale without destabilizing the adjacent emitters. The downstream beam will show a main center lobe with repeat lobes nearby, separated by the angle set by the wavelength divided by the aperture width. In this case, the opposite edges of the aperture are studied for the phase wrap angle as noted previously. Emitters in a grid which together fully fill the aperture will act like a single large aperture and produce the classic sync profile with a central intense lobe surrounded by lobes of rapidly dropping intensity, as shown in FIG. 1. The extra lobes on either side are suppressed in the fashion of the sync function if the emitter area approaches a fill factor of 100% over the aperture. But lower fill factor emitters in a grid pattern will result in power diverted from the main beam to the side lobes. Small points in a grid with low fill factor over the aperture will create a tightly bound pattern of roughly equal intensity lobes downstream. Unfortunately, manufacturing limitations tend to limit the fill factor of OPAs to far <100%, often closer to 25%, creating a grid of similar intensity points as shown in FIG. 2. Thus, OPAs face many challenges to precision long range operation, with two of these issues based on aperture size and emitter distribution within the aperture as noted above.

The second approach, as shown and described in DARPA Excalibur http://darpa.mil/program/excalibur.com, is to use fewer emitters over a larger aperture. This solves the aperture scale challenge for long range operation, but now drastically reduces the system FOR. Not only is the aperture physically larger, but the number of emitters is reduced from order 103-6 to order 100-1. The pitch between emitters is substantially increased and so the wrapping angle which limits FOR is thus shrunk. The emitters tend to be highly directional in these systems as there is no need for high divergence given the small FOR. These systems thus trade FOR for increased range. The macroscopic systems also tend to have less grid-like distribution of apertures, instead opting for a radial distribution. The variation in the effective pitch helps suppress but not entirely remove the fill-factor generated beam pattern described above.

There is thus a strong interest in the art to find a way to gain the benefits of both kinds of systems, the large FOR of microscale OPAs with the large aperture and long range of the macroscale OPAs.

SUMMARY

This section provides a general summary of the disclosure, and is not a comprehensive disclosure of its full scope or all of its features.

In one aspect the present disclosure relates to a coherent aperture array system for steering an optical source beam. The system may comprise a plurality of spaced apart, steerable emitters, with each aimable at a remote target location to independently steer separate portions of the source beam toward the target location. Each steerable emitter is further steerable such that the separate portions of the source beam projected from each steerable emitter coherently recombine to produce a coherent beam at a target location.

In another aspect the present disclosure relates to a coherent aperture array system for steering an optical source beam. The system may comprise a refractive beam splitter for receiving and splitting the optical source beam into a plurality of portions. A plurality of spaced apart, steerable emitters may be included which are each able to be aimed at a remote target location to receive and steer a respective one of the portions of the source beam toward the target location. Each steerable emitter is able to be at least one of electronically, mechanically or electromechanically moved in at least one of a tilting motion about a first axis, a tipping motion about a second axis perpendicular to the second axis, or a piston motion about a third axis perpendicular to both the first and second axes. Each steerable emitter may include a subaperture controllable independently of a remaining reflective surface of its associated steerable emitter, to receive and reflect a subportion of its received portion of the source beam. The subportion reflected forms a sense beam which is reflected toward a phase imaging system. A separate reference beam is created from the portion of the source beam that travels toward each steerable emitter, and is reflected back toward the refractive beam splitter. As such, each reference beam is thus associated uniquely with one of the steerable emitters. A phase imaging system may be included which is responsive to each of the reference beams and the sense beams. The phase imaging system determines phase differences between the portions of the source beam being transmitted from each steerable emitter. An electronic control system may also be included which is configured to determine needed control signals to apply needed pointing corrections to each of the steerable emitters such that all of the portions of the source beam transmitted from the steerable emitters are at least substantially in phase with one another.

In still another aspect the present disclosure relates to a method for steering an optical source beam. The method may comprise using a plurality of spaced apart, steerable emitters, with each being able to be aimed at a remote target location to steer portions of the source beam toward the target location. The method may further involve using a subaperture of each steerable emitter, controllable independently of a remaining reflective surface of its associated steerable emitter, to receive and reflect a subportion of the source beam portion. The subportion forms a sense beam which is reflected toward a phase imaging system. The method may further include creating a separate reference beam from the portion of the source beam travelling toward each steerable emitter. Each reference beam is thus associated uniquely with one of the steerable emitters. The method may further include analyzing each of the reference beams and the sense beams to determine phase differences between the portions of the source beam being transmitted from each steerable emitter.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a block diagram of one embodiment of a coherent aperture steered emitter system in accordance with the present disclosure;

FIG. 4 is an enlarged view of one section of the drawing of FIG. 3 better illustrating how the sense and reference beams are created;

FIG. 5 is a high level plan diagram showing how a plurality of steered emitters may be laid out in a circular pattern around the source beam;

FIG. 6 is a plot showing the greatly diminished side lobes and the high intensity main lobe of an optical signal produced using the system of the present disclosure.

DETAILED DESCRIPTION

Example embodiments will now be described more fully with reference to the accompanying drawings.

The present disclosure provides systems and methods which provide for the benefits of both microscale and macroscale OPAs: the large FOR of microscale OPAs with the large aperture and long range of macroscale OPAs. The present disclosure accomplishes this by using physically steered emitters, rather than the un-steered emitters generally used by present day, state-of-the-art systems described above, and using phase coherence to suppress divergence rather than steering the beam. This is because steered emitters can decouple FOR from the phase modulation limitations of steering that typically handicap large aperture systems.

In various embodiments, multiple beamsteering elements are employed which can move in one or all of tip, tilt and piston movements to steer a high divergence beam toward a target. Tilting movement may be defined as movement about one axis, for example the X axis, while tipping movement may be defined as movement about a Y axis which is orthogonal to the X axis. Piston movement (i.e., "pistoning") may be defined as translating movement back-and-forth, along a Z axis perpendicular to both the X and Y axes.

A phase modulator may be used, whether part of the beamsteering or a separate element from the beamsteering, to phase cohere the multiple elements so the outputs positively interfere and produce a low divergence beam pointed at the target. Each beamsteering element acts as a unidirectional emitter when phase coherent. The various embodiments of the present disclosure may be thought of as a "coherent aperture of steered emitters" ("CASE") system, which enables multiple small aperture systems to act collectively as a single larger aperture. This provides beam quality at the diffraction limit associated with a much larger aperture system without the size, weight, power and precision complexity of the larger system. The use of mechanically steered elements allows for extremely large fields of regard while simultaneously suppressing higher order diffraction modes. While mechanically steered emitter elements are preferred, the CASE system could operate with non-mechanical beam steering (liquid crystal, metamaterials, etc.). The important part is that the emitters are steered in some way. The various embodiments disclosed herein behave like the macro-scale OPAs without the FOR restriction of the un-steered emitters. The beams from the apertures of the mechanically steered emitters are still highly directional, and as such they do not generate any interference patterns at large angles. This suppresses unwanted sidelobes, unlike microscale large array OPAs, where suppressing the side lobes is a challenge. But the beams from the mechanically steered emitters of the embodiments disclosed herein can achieve FORs associated with the tip/tilt/pistoning range of the emitters, significantly larger than for the macroscale OPAs.

Figure 2:
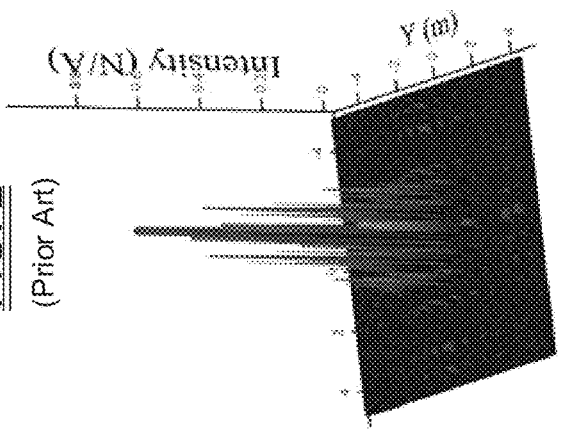
FIG. 2 is a plot illustrating the intensity points produced by a conventional OPA system with a low fill factor of emitters in a grid pattern, which results in power diverted from the main beam to the side lobes, thus creating a grid of similar intensity points arranged around the main beam.
Figure 5A:
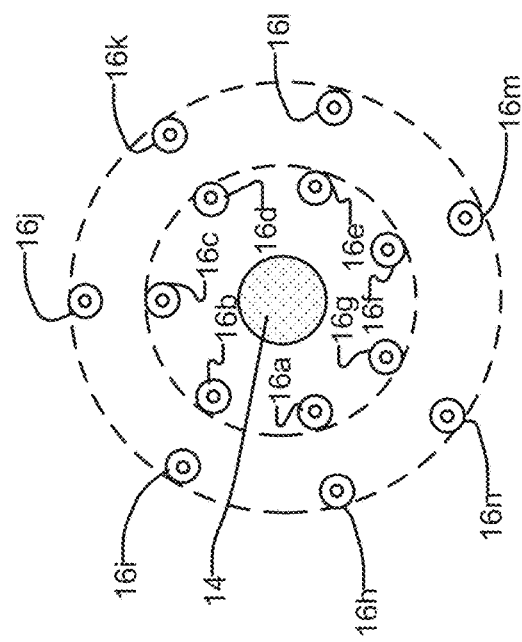
FIG. 5*a* shows another configuration where the plurality of steered emitters may be laid out in a plurality of concentric circles around the source beam.
Figure 1:
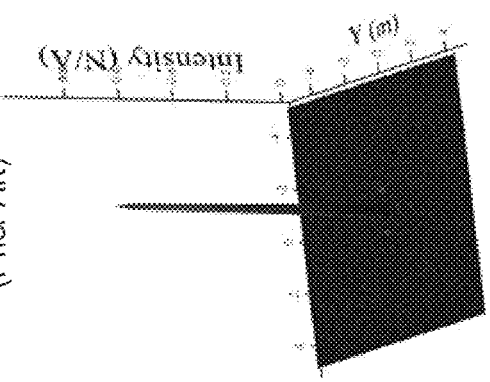
FIG. 1 is a plot of beam intensity for a conventional OPA, which includes a plurality of emitters in a grid which together fully fill the aperture, and which act like a single large aperture and produce the classic sync profile with a central intense lobe surrounded by lobes of rapidly dropping intensity.

FIG. 3 illustrates one example of a coherent aperture steered emitter system 10 in accordance with the present disclosure. In this example the system includes a main beam generator 12 for generating a source beam 14, at least a pair of steered emitters 16a and 16b (hereinafter simply "emitters" 16a and 16b), a refractive beam splitter 18, a pair of source beam reflectors 20a and 20b, a phase imaging reflector 22, and a phase imaging subsystem 24. The reflectors 20a, 20b, the phase imaging reflector 22 and the phase imaging subsystem 24 form a phase monitoring and control system 26. The emitters 16a and 16b may be located equidistant from their respective reflectors 20a and 20b' respectively. If more than two emitters 16 are included in the system 10, then the emitters may be arranged about a circle, as indicated in FIG. 5. Still further, a greater number of emitters 16 may be configured in a plurality of concentric circles, as shown in FIG. 5a for the emitters 16a-16n.

While the system 10 is operable with just two emitters 16, it is expected that most implementations will more preferably involve between 2-50 emitters, and more typically between 6-10 emitters 16. However, the present disclosure may be implemented with virtually any number of emitters 16 two or greater. Furthermore, by the terminology "steering" or "steerable", it is meant at least one of electronically, mechanically or electromechanically controlled to achieve the needed beam aiming from the emitters 16.

The emitters 16 may each be formed by a beamsteering array. One example of such an array which is suitable for use with the present system 10 is the Lightfield Directing Array ("LDA") disclosed in U.S. Pat. No. 10,444,492, assigned to the assignee of the present disclosure, which is hereby incorporated by reference into the present disclosure. A beamsteering array like the LDA can generate tip, tilt and piston motion movements for each emitter element. The steering of each of the emitters 16 can be controlled independently by an electronic control system 28. The electronic control system 28 may include a non-volatile memory 30 for containing a database 30a of information needed or helpful for determining the needed pointing control signals for the emitters 16 to correct the phase misalignment of each emitter. The data contained in the database 30a may be contained in the form of a look-up table or in any other suitable form or arrangement.

The central optical path contains the source beam 14 to be emitted and steered. In the embodiments the beam 14 is passed to the refractive beam splitter 18 which splits the beam 14 in the directions necessary to illuminate each of the steered elements 16. In some preferred implementations, this splitting is in a radial spoke-like layout. Each steered element 16 steers most of the subportion of the source beam 14 that it receives downstream towards the target, but a fraction of each received subportion of the beam 14 is reflected back by each steered element 16 along the optical column (i.e., the optical path of the incoming subportion of the source beam 14) to provide a measurement of phase coherence.

In one embodiment of the system 10, as indicated in FIG. 3, each emitter 16a and 16b includes a subaperture 16a1 and 16b1, respectively. If more than two emitters 16 are used, then each emitter includes a subaperture, as indicated by subapertures 16a1-16g1 in FIG. 5. The diameter (i.e., aperture) needed for the source beam 14 will be a major consideration for the appropriate number of emitters 16 used with the system 10.

Each subaperture 16a1-16g1 of its respective emitter 16a-16g is reoriented to point at a nearby reflective surface that will flip the orientation of a small portion of the subportion of the main beam 14 which it is receiving and transmitting. So for example in FIG. 3, the subaperture 16a1 of emitter 16a is aimed to transmit a small portion of the subportion of the main beam 14 which it receives, which may be termed a "sense beam" 14a', back to reflector 20a. Likewise, the subaperture 16b1 of the emitter 16b similarly is aimed to receive and re-transmit a small portion of the subportion of the main beam 14 it receives, which may be termed sense beam 14b', back to reflector 20b. These sense beams 14a' and 14b' are therefore small subportions of the main beam 14. This occurs for each emitter 16 used in the system 10.

With further reference to FIGS. 3 and 4, the construction of reflector 20a is such that it includes a major portion having a coating which is 100% reflective, and a minor portion 20a1, that is less reflective, for example 50% reflective. The minor portion 20a1 reflects a small, set percentage of the subportion of the source beam 14 travelling towards the emitter 16a, 50% in this example, while allowing the remainder to pass through. This small portion of the subportion of the beam 14 that passes through the reflector 20a may be viewed as a "reference" beam portion and is labelled 14a'r in FIG. 4. As shown in FIG. 4, a mirror 20a2 receives this reference beam portion 14a'r and reflects it back to the reflector 20a, where about 50% of its intensity (now down to about 25% of the original intensity of the source beam 14) is reflected back to phase imaging reflector 22, and then by the phase imaging reflector 22 to the phase imaging subsystem 24.

Referring further to FIGS. 3 and 4, the sense beam 14a' is reflected back from the subaperture 16a1 and thus begins travelling in the reverse direction, along the same optical path as the source beam 14, toward the reflector 20a. The sense beam 14a' reaches and passes through the reflector 20a, where its intensity is reduced by the set percentage (in this example 50%), and is thus about 25% of the original intensity of the source beam 14. This signal component is denoted by arrow 14a′ₛ, and is reflected by the phase imaging reflector 22 to the phase imaging system 24. Thus, the phase imaging system 24 receives beam component 14a′ₛ, as well as beam component 14a′ᵣ returning from the mirror 20b. FIG. 3 shows these operations occurring with just the two emitters 16a and 16b. FIG. 5 indicates this reverse travel using arrows which indicate each emitter 16a-16g using its subaperture 16a1-16g1 to reflect back the received portion of the beam 14 that will form the sense beam portions 14a′ₛ, 14b′ₛ, etc., along the same path being travelled by its respective subportion of the main beam 14.

Referring further to FIG. 5, the sense beams 14a′ₛ, 14b′ₛ, etc., associated with each steered emitter 16a, 16b, etc., can be recombined in the main optical column (i.e., represented by the main beam 14) and interfered with the main beam 14 using the phase imaging subsystem 24. The phase imaging subsystem 24, shown in FIGS. 3 and 4, operates to create an interferometric measure of distance to each of the steered emitters 16a-16g. A single imaging sensor within the phase imaging subsystem 24 may capture the interference of the main beam 14 with each sense beam 14a′ₛ, 14b′ₛ, etc., in different sections of the image, allowing for simultaneous measurement of all the sense beams 14a′ₛ, 14b′ₛ, etc.

It will be appreciated that that each sense beam 16a1-16g1 emitted from its associated subaperture 16a1-16g1 traverses the path of the main beam 14 in both forward and reverse, capturing any path length (i.e., relative to each emitter 16a-16g) change twice over. The sense beams 16a1-16g1 do not measure the absolute distance traveled to their respective steered elements 16a-16g, but each sense beam captures any change in the optical path length, relative to the other sense beams. The optical path length relative to each emitter 16a-16b can be adjusted by either separate path length modulation elements, for example by standard adaptive-optic ("AO") wavefront modulating piston reflectors or via path length modulation in the steered emitter. In one preferred embodiment, this is done by piston modulation of the emitter 16, bringing it closer or further to the main beam splitting hub (i.e., refractive splitter 18). An important feature of the system 10 is that the phase delay between each emitter's 16a-16g phase reference plane is held to a constant by the sense subaperture 16a1-16g1, and the beam 14 is mechanically steered with tip/tilt and piston control using each emitter 16a-16g.

FIG. 3 also shows the large aperture, defined by arrow 40, which is formed by the system 10. Waveforms 42 and 44, representing the beam subportions 16a and 16b, can be seen to be in phase.

FIG. 6 shows a plot 50 of the source beam 14 produced by the system 10. The steering emitters 16 of the system 10 together fully fill the aperture and act like a single large aperture to produce the classic sync profile with a central intense lobe 52 surrounded by side lobes 54 of rapidly dropping intensity.

Calibration

The system 10 may be tuned during calibration to determine the interference pattern value between sense beams 14a′ₛ, 14b′ₛ, etc., that corresponds to a synchronized phase output for the steered emitters 16. The goal is to ensure the phase reference plane is known for each emitter 16. The sense beam, e.g., sense beam 14a′ₛ, is steered and tuned by the subaperture of the emitter 16 to find this plane reference plane. The calibration may be done by steering each of the emitters 16 towards a close sensor located at known angular locations versus the optical axis (i.e., an axial center of the source beam 14) of the system 10. First, the tip/tilt for each emitter 16 may be adjusted until it is centered on the target. This would provide tip/tilt offset adjustment to synchronize the emitters 16 to the orientation of the overall system 10. Next, sets of two steered emitters 16 may be pointed at the downstream sensor to produce an interference pattern from their overlapping beams on the sensor. This interference pattern will appear as an approximately 1 D sync pattern that translated perpendicular to the illuminated pattern lines depending on the relative phase between the two steered emitters 16. One steered emitter 16 may be considered the baseline, and the other considered the "follower". The sense beam interference reading from the baseline emitter 16 may be set to a constant. The sense beam interference reading for the follower may then be modulated by tuning the phase reference plane via piston height of the sense subaperture (e.g., 16a1) and steering subaperture (the steering subaperture being represented by the remainder of the steering elements that are not associated with the sense subaperture) synchronously in the follower until the sync pattern on the target is centered on the sensor. The interference measurement determines the correct relative phase angle to hold as a reference between the baseline and follower. The process may be repeated for all n−1 emitters 16 relative to the baseline emitter, thus calibrating the whole system 10. This calibration determines the phase offsets for each emitter 16 necessary to phase cohere the outputs from all of the emitters 16. Thermal expansion or structural distortion will show up as a change in the sense beam interference reading, countered by piston adjustment in the sense subaperture (e.g., 16a1) in the steered emitter (e.g., 16a) until the sense beam interference reading is reset to the phase reference value. The steering subaperture of the steered emitter 16 may then use this new phase reference plane as its zero on which to calculate how to place the steering elements for downstream coherence. This sensing operation is thus searching for the reference phase value which can be found repeating every wavelength, thus the system 10 need not carry out large piston adjustments at each emitter 16 to rephrase. If the sense subaperture (e.g., subaperture 16a1 of emitter 16) reaches a piston range limit, it can shift the phase reference plane piston value by n/2*wavelength to reacquire the reference phase value again. The reference value found by the sense aperture becomes the phase reference plane for the rest of the steered emitter 16 surface, so the whole steered emitter can locate against a known phase front.

Phase coherent operation will be maintained at high angles by adjusting the piston extension of the steering subaperture (e.g., all the steerable elements of a given emitter 16 besides those of its subaperture) of the steered emitter 16. The sense subaperture would not need to be altered; it may remain trained on the reflective surface, holding at the phase reference plane. The steering aperture (e.g., emitter 16a) may be pistoned relative to the reference plane provided by its sense subaperture (e.g., 16a1), tuned to correctly interfere at the target location. This modulation on top of the phase reference plane may be determined by calculations based on the angle of the target and location of the steered emitter 16. With the emitter 16 location being known to high precision and the phase reference plane being measured in real time, the system 10 may determine the piston value associated with centering the interference sync pattern on the target.

Initially the tip/tilt steering of the steered emitters 16 may paint the target location with a high divergence beam, potentially useful for beaconing for link acquisition. The steered emitters 16 may each generate a high divergence beam with approximately 50 μrad divergence in the case of 2_cm emitters 16 working on 1 μm wavelength light. As long as each of these beams overlaps at the target, then a low divergence beam may be aligned to the target via interference effects. The high divergence beam does not need to be precisely centered on the target; the system 10 can tolerate some angular jitter in the steered emitters 16 as long as the high-divergence beam continues to paint the target within its high-divergence cone. To refine the beam divergence on target, the piston adjustment of the steered emitters 16 may be adjusted to shift the interference pattern of their beams. For example, with 1 μm light, 2_cm LDA apertures located on a 10 cm diameter circle could be made to act as a single 10_cm diameter aperture. The interference pattern between any two emitters would be a 1D sync function with lobes every 1_μm/10_cm=10_μrad, so approximately 5 lobes would show within the 50 μrad illumination of the high divergence beam. The piston fine adjustment on top of the phase reference planes will shift the sync function laterally, allowing for extremely fine adjustment of the beam center. When the steered emitters 14 rely on their phase reference planes, they will positively interfere to create a radial sync pattern somewhere in the high divergence illuminated area around the target. The issue lies in shifting that sync pattern to precisely lie on the target. The phase value for the steered emitters 16 may be tuned to shift the center of this radial function onto the target. The tuning may be added as an additional term on to the phase reference plane supplied by the emitter's 16 sense subaperture (e.g., 16a1) measurement. The total effect will be a low beam divergence equivalent to a 10 cm aperture but composed of 2_cm steered emitters 16, able to operate over the full FOR of the steered emitters, which for the LDA, in particular, is approximately 60° in both axes. Thus, each steered emitter 16 initially and approximately paints the target with tip and tilt control, then the interference pattern is centered on the target with fine piston control.

Figure 7:
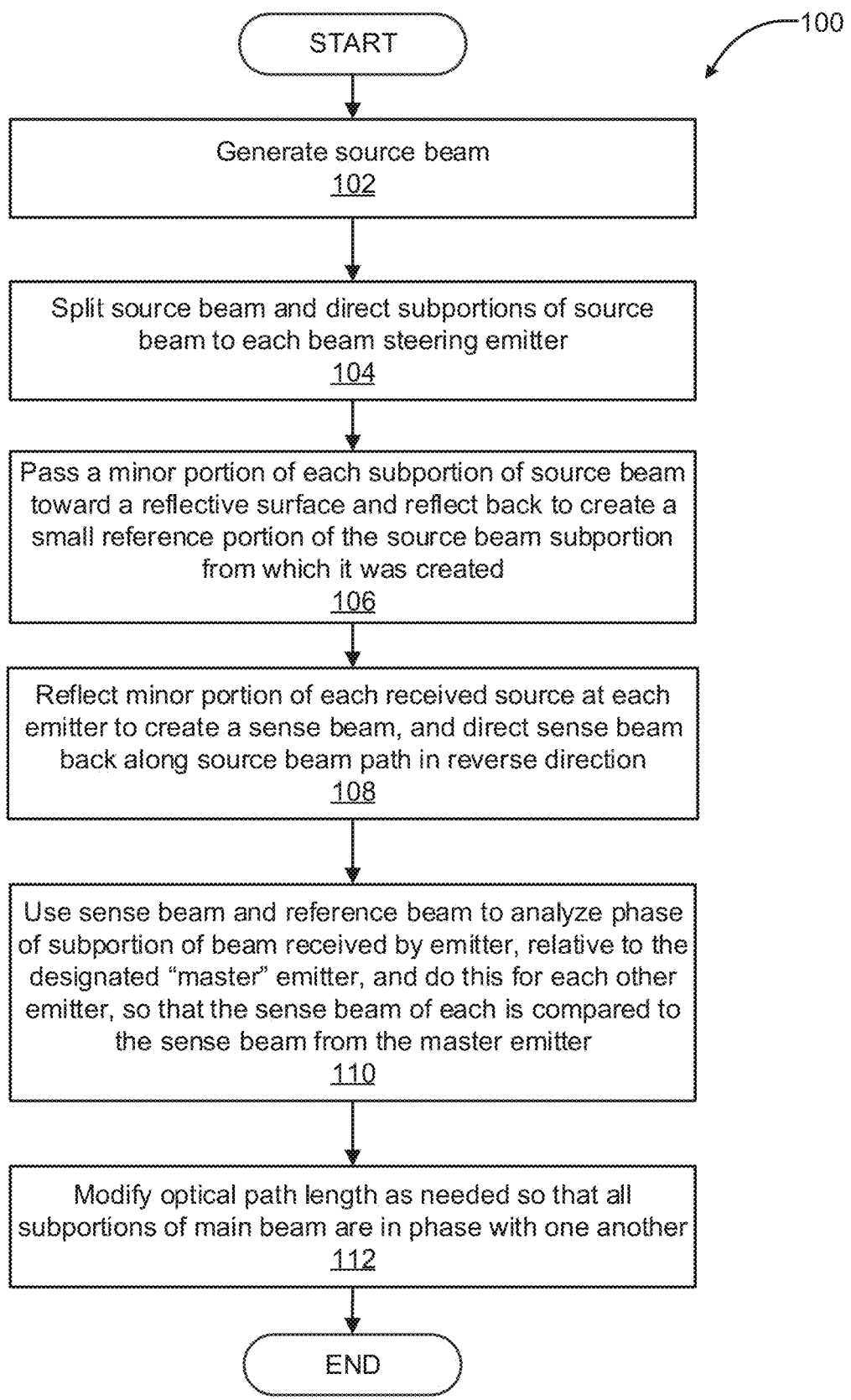
FIG. 7 is a high level flowchart summarizing major operations that may be carried out using the system 10 during operation.

FIG. 7 is a flowchart 100 that summarizes, at a high level, the various operations described above in controlling the phase of each subportion of the source beam 14. At operation 102 the source beam 14 is generated. At operation 104 the source beam 104 is split into two or more subportions and directed to a corresponding plurality of spaced apart steered emitters. At operation 106 a minor portion of each one of the split subportions of the source beam 104 is passed to a reflective surface and reflected back, to create a small (i.e., low intensity) reference portion of the source beam subportion from which it was created. At operation 108 a minor portion of the subportion of the source beam 14 that reaches each emitter 16 is reflected by its subaperture (e.g., 16a1) back along the same optical path being travelled by the subportion of the source beam 14, but in reverse, to create the sense beam (e.g., $14a'_s$). At operation 110 the sense beam and the reference beam are used to analyze the phase of the specific subportion of the source beam 14 received by the emitter 16, relative to a designated "master" one of the emitters 16a-16g. For example, if emitter 16g is designated as the "master", then the phase of each one of the other subportions of the source beam 14 being directed to the emitters 16a-16f, determined from their associated sense beams, will be compared against the phase of the sense beam produced by emitter 16g. Thus, sense beam 14a's will be compared to the sense beam from emitter 16g, then the sense beam from emitter 16b, and so forth.

At operation 112 the needed corrections for the optical path length for each subportion of the source beam 14, directed at each emitter 16 of the system 10, are determined, for example with the help of the phase imaging subsystem 24, and the needed corrections (i.e., emitter steering control signals) are applied by the electronic of the system 10 so that all subportions of the source beam 14 are in phase with one another.

The various embodiments of the system 10, with its use of mechanically steered elements in each emitter 16, allows for extremely large FOR as well as the ability to suppress higher order diffraction modes. The SWaP benefit is expected to be significant for optical systems employed on portable platforms, which may not have the capability to carry large apertures but need to maximize beam quality, and also have the ability to carry out high precision beam pointing. A good example of this would be in long distance laser steering for space-based laser communications applications where SWaP limits are extreme due to satellite limitations, but distances can be 10's to 100's of thousands of km, requiring an extremely low divergence beam to enable optical communication capability.

The various embodiments of the system 10 described herein are thus expected to find utility in a wide range of applications, and particularly applications involving long range laser communications and high precision beamsteering optics for space and defense applications.

It will also be appreciated that while the reflective sensing mode described herein is expected to be a particularly useful and desirable operating mode, other modes of sensing are certainly possible. For example, another operating mode may involve using the sensing subaperture on the steered emitter to shine light directly back to the phase imaging system such that the phase imaging system just captures the relative phase between these returns from each of the emitters. This removes the comparison of each sense beam with the reference beam. This operating mode would be slightly less stable but it could still provide relative control of phase in certain situations. Alternately, the phase of each emitter could be determined in the far-field by modulation of each emitter, and then a determination may be made as to how this modulation effects the far field behavior. The beam may be optimized in this way, bringing each emitter 'intophase' by optimizing the output performance. This process could be done sequentially or with multiple emitters in parallel if the modulation of each emitter is carried out at a unique and discernable frequency. This would be a slightly slower and less robust form of phase control, since it would require a long range feedback loop, but it could nevertheless still reach phase coherence.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A coherent aperture array system for steering an optical source beam, the system comprising:
   a beam splitter for splitting the optical source beam into a plurality of separate beam portions;
   a plurality of spaced apart, steerable emitters each for receiving only one of the plurality of separate beam portions of the optical source beam, each one of said steerable emitters being able to be aimed at a remote target location to independently steer the plurality of separate beam portions of the source beam toward the target location; and
   each said steerable emitter further being steerable such that the separate beam portions of the source beam projected from each said steerable emitter coherently recombine to produce a coherent beam at a target location;
   a pair of source beam reflectors for receiving the first and second beam portions and reflecting back subportions of each as a reference beam portion uniquely associated with a specific one of the steerable emitters;
   a phase imaging system;
   each said steerable emitter including a subaperture controllable independently of a remaining reflective surface of its associated said steerable emitter, to receive and reflect subportions of the first or second beam portion being received back as a sense beam along a common optical path being travelled by said first or second reference beam portion toward the phase imaging system; and
   the phase imaging system being responsive to each of the reference beam portions and the sense beams, for determining phase differences between the reference beam portion of each said steerable emitter and its associated sense beam.

2. The system of claim 1, further comprising an electronic control system for determining needed control signals to be transmitted to each said steerable emitter, based on the determinations of phase differences from the phase imaging system, to produce a coherent optical beam from all of the steerable emitters, at the target location.

3. The system of claim 1, wherein each said steerable emitter is able to move in at least one of:
   a tilting motion about a first axis;
   a tipping motion about a second axis perpendicular to the first axis; or
   a piston motion about a third axis perpendicular to both the first and second axes.

4. The system of claim 1, wherein each said steerable emitter is able to move in all of:
   a tilting motion about a first axis;
   a tipping motion about a second axis perpendicular to the first axis; and
   a piston motion about a third axis perpendicular to both the first and second axes.

5. The system of claim 1, wherein the beam splitter comprises a refractive beam splitter for receiving the source beam and splitting the source beam into the plurality of separate beam portions to be directed toward each of the steerable emitters.

6. The system of claim 1, wherein the phase imaging system includes a source beam reflector for reflecting separate ones of the plurality of separate beam portions of the source beam towards an associated single one of the steerable emitters.

7. The system of claim 6, wherein each one of the source beam reflectors includes a major portion having a first reflective surface and a minor portion having a second reflective surface reflective less than the first reflective surface.

8. The system of claim 7, wherein the reflective surface of the major portion forms a near 100% reflective surface, and the minor portion forms a reflective surface with a reflectivity less than 100%.

9. The system of claim 8, wherein the phase imaging system further comprises a separate mirror associated with one of the source beam reflectors to receive a reference beam that is formed from a portion of the source beam which passes through the minor portion of its associated said source beam reflector, and where the mirror is configured to reflect the reference beam back toward its associated said source beam reflector.

10. The system of claim 9, wherein each said source beam reflector is configured to receive the sense beam from its associated steerable emitter, and to pass the sense beam therethrough.

11. The system of claim 10, wherein the phase imaging system further includes a phase imaging subsystem arranged to receive the sense beams and the reference beams reflected from each of the source beam reflectors, and to determine phase differences between the sense beam and reference beam associated with each one of the steerable emitters.

12. The system of claim 1, wherein the plurality of steerable emitters are arranged in a circle about the source beam with the source beam aligned at an axial center of the circle.

13. A coherent aperture array system for steering an optical source beam, the system comprising:
    a refractive beam splitter for receiving and splitting the optical source beam into a plurality of reference beam portions;
    a plurality of spaced apart, steerable emitters each being able to be aimed at a remote target location to receive and steer a respective one of the portions of the source beam toward the target location;
    each said steerable emitter is able to be at least one of electronically, mechanically, or electromechanically moved in at least one of:
        a tilting motion about a first axis;
        a tipping motion about a second axis perpendicular to the first axis; or
        a piston motion about a third axis perpendicular to both the first and second axes;
    each steerable emitter including a subaperture controllable independently of a remaining reflective surface of its associated said steerable emitter, to receive and reflect a subportion of its received portion of the source beam, the subportion reflected forming a sense beam which is reflected toward a phase imaging system along a common optical path travelled by its associated said reference beam portion;
    separate reference beam portions created from the source beam, the reference beam portions travelling toward associated ones of said steerable emitters, each said reference beam portion thus being associated uniquely with one of the steerable emitters;
    a phase imaging system responsive to each of the reference beam portions and the sense beams, for determining phase differences between the reference beam portions and the sense beams; and
    an electronic control system configured to determine needed control signals to apply needed pointing corrections to each of the steerable emitters such that all of the reference beam portions created from the source beam are transmitted from the steerable emitters at least substantially in phase with one another.

14. The system of claim 13, wherein the steerable emitters are configured about a circle.

15. The system of claim 13, wherein:
    the phase imaging system includes a source beam reflector for reflecting each one of the reference beam portions created from the source beam towards associated single ones of the steerable emitters; and
    wherein each one of the source beam reflectors includes a major portion having a first reflective surface and a minor portion have a second reflective surface less reflective than the first reflective surface.

16. The system of claim 15, wherein:
    the phase imaging system further comprises a separate mirror associated with one of the source beam reflectors to receive a portion of the reference beam portion which passes through the minor portion of its associated said source beam reflector;
    wherein the mirror is configured to reflect the reference beam back toward its associated said source beam reflector; and
    wherein each said source beam reflector is configured to receive the sense beam from its associated steerable emitter, and to pass the sense beam therethrough.

17. The system of claim 16, wherein:
    the phase imaging system further includes a phase imaging subsystem arranged to receive the sense beams and the reference beam portions reflected from each of the source beam reflectors, and to determine phase differences between the sense beam and reference beam portions associated with each one of the steerable emitters.

18. A method for steering an optical source beam, the method comprising:
    using a plurality of spaced apart, steerable emitters each being able to be aimed at a remote target location to steer portions of the source beam toward the target location;
    using a subaperture of each said steerable emitter, controllable independently of a remaining reflective surface of its associated said steerable emitter, to receive and reflect a subportion of the source beam portion, the subportion forming a sense beam which is reflected toward a phase imaging system;
    creating a separate reference beam from the portion of the source beam travelling toward each said steerable emitter, each said reference beam thus being associated uniquely with one of the steerable emitters and travelling along a common optical path with the source beam portion from an associated one of the steerable emitters towards a phase imaging system; and
    using the phase imaging system to receive and analyze each of the reference beams and the sense beams, for determining phase differences between the portions of the source beam being transmitted from each said steerable emitter.

19. The method of claim 18, further comprising using the determined phase differences to generate control signals applied to each of the steerable emitters to modify a phase of the portion of the source beam being emitted from each said steerable emitter, to bring all of the portions of the source beam into phase coherence at the target location.

\* \* \* \* \*